(12) United States Patent
Langhoff et al.

(10) Patent No.: US 9,099,725 B2
(45) Date of Patent: Aug. 4, 2015

(54) HIGH CURRENT CONNECTION DEVICE FOR ENERGY STORAGE

(75) Inventors: Wolfgang Langhoff, Leonberg (DE); Till Beck, Heilbronn (DE)

(73) Assignee: Amphenol-Tuchel Electronic GMBH (DE)

( * ) Notice: Subject to any disclaimer, the term of this patent is extended or adjusted under 35 U.S.C. 154(b) by 393 days.

(21) Appl. No.: 13/202,473

(22) PCT Filed: Feb. 27, 2010

(86) PCT No.: PCT/EP2010/001234
§ 371 (c)(1),
(2), (4) Date: Oct. 27, 2011

(87) PCT Pub. No.: WO2010/099909
PCT Pub. Date: Sep. 10, 2010

(65) Prior Publication Data
US 2012/0034496 A1  Feb. 9, 2012

(30) Foreign Application Priority Data
Mar. 5, 2009 (DE) .......................... 10 2009 011 377

(51) Int. Cl.
H01M 2/20 (2006.01)
(52) U.S. Cl.
CPC ..................... *H01M 2/206* (2013.01)
(58) Field of Classification Search
USPC .......................................................... 429/7
See application file for complete search history.

(56) References Cited

U.S. PATENT DOCUMENTS

| | | | |
|---|---|---|---|
| 6,495,787 B1 | 12/2002 | Nadeau et al. | |
| 2008/0102362 A1 | 5/2008 | Nii et al. | |
| 2008/0124617 A1* | 5/2008 | Bjork | 429/90 |
| 2010/0104932 A1 | 4/2010 | Heidenbauer | |
| 2010/0248010 A1* | 9/2010 | Butt et al. | 429/160 |

FOREIGN PATENT DOCUMENTS

| | | |
|---|---|---|
| AT | 9790 U1 | 3/2008 |
| DE | 19810746 A1 | 9/1999 |
| DE | 10101050 A1 | 7/2001 |

(Continued)

*Primary Examiner* — Patrick Ryan
*Assistant Examiner* — Lucas J O'Donnell
(74) *Attorney, Agent, or Firm* — Blank Rome LLP

(57) ABSTRACT

The present invention relates to a high current connection device for contacting multiple energy storage units of an energy storage in parallel and/or in series, having the following characteristics: two poles for connecting the high current connection device to a current consumer, at least two positive terminal contacting connections for connecting to positive terminals of the energy storage units, at least two negative terminal contacting connections for connecting to negative terminals of the energy storage units, a printed circuit board for receiving the poles, the positive terminal contacting connections and the negative terminal contacting connections, and wherein each positive terminal contacting connection is assigned to one negative terminal contacting connection and one energy storage unit. Furthermore, the present invention relates to an energy storage in particular for hybrid vehicles, comprising multiple energy storage units, wherein the energy storage units are electrically connected in parallel and/or in series to each other by the high current connection device described above, and/or wherein the energy storage can be connected to a current consumer via the high current connection device.

15 Claims, 1 Drawing Sheet

(56) References Cited

FOREIGN PATENT DOCUMENTS

| DE | 102007020295 | A1 | 11/2008 |
| --- | --- | --- | --- |
| DE | 202008015414 | U1 | 2/2009 |
| JP | 2002151045 | A | 5/2002 |
| JP | 2004265830 | A | 9/2004 |
| JP | 2004311165 | A | 11/2004 |
| JP | 2007110035 | A | 4/2007 |
| WO | 2008034560 | A1 | 3/2008 |

* cited by examiner

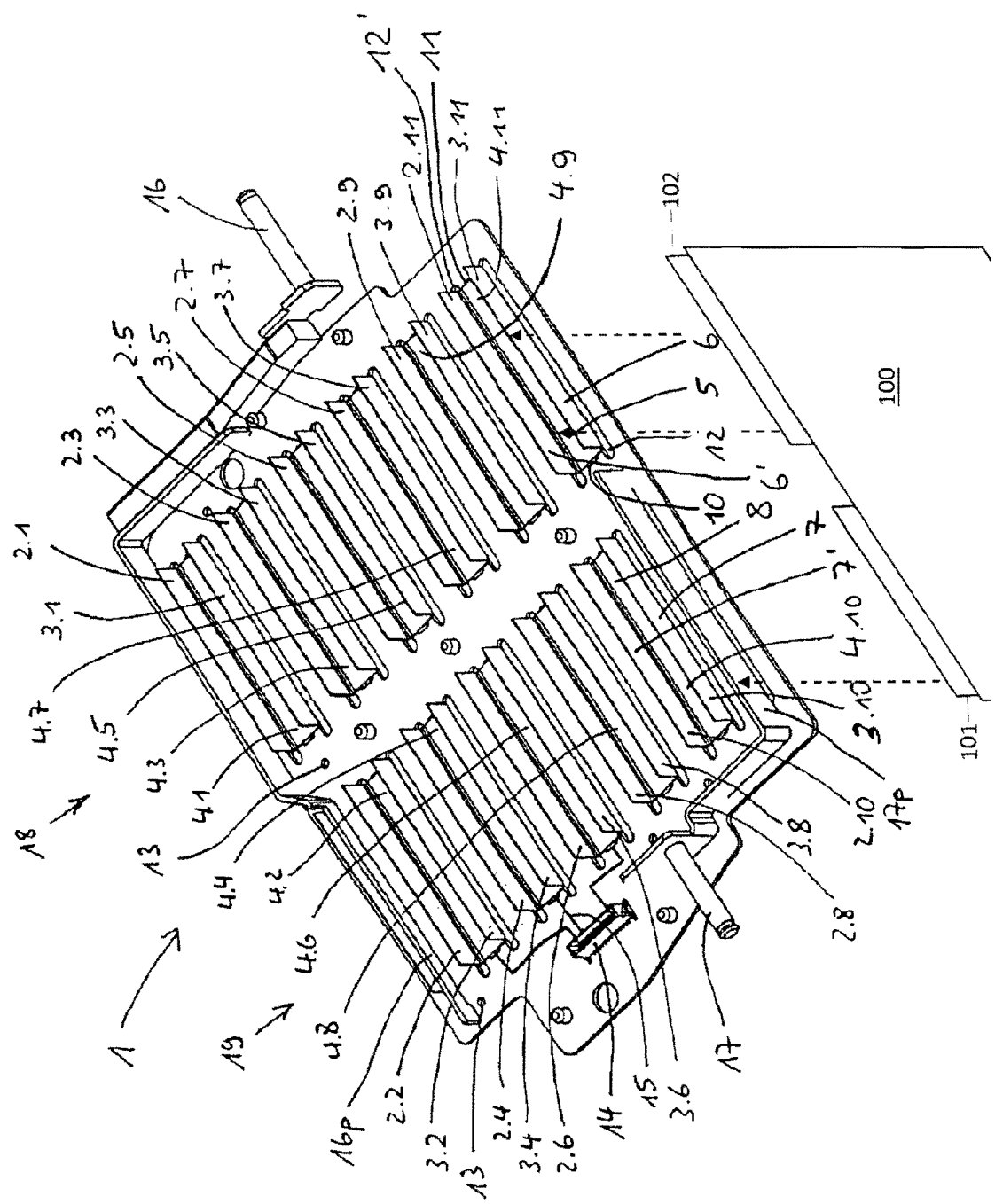

HIGH CURRENT CONNECTION DEVICE FOR ENERGY STORAGE

CROSS-REFERENCE TO RELATED APPLICATIONS

The present application claims the benefit of International Patent Application No. PCT/EP2010/001234, filed Feb. 27, 2010, which in turn claims priority to DE Patent Application No. 10 2009 011 377.0 filed Mar. 5, 2009, the entire disclosures are incorporated by reference herein.

This invention relates to a high current connection device for parallel and/or serial contact-making of several energy storage units of an energy storage as claimed in Claim 1 and an energy storage as claimed in Claim 14.

These energy storages are used for example in motor vehicles, especially with electric or hybrid drives. The energy storages conventionally consist of several cells which are electrically connected. Very many cells must be connected both in parallel (to increase capacitance) and also in series (to increase voltage) especially for hybrid vehicles. For the required compact design of the energy storages major temperature fluctuations occur in their operation, while the ambient temperature in motor vehicles is likewise subject to major fluctuations. Moreover the cells change their geometrical dimensions due to the respective charging state.

In addition there is the technical problem that there must be considerable conductor cross sections due to the high currents.

Another technical problem is the vibrations and impacts which occur in operation of vehicles.

Due to the use of different materials for conducting the current there is moreover the problem of electrochemical processes and there are technical difficulties in connecting these components.

Therefore the object of the invention is to devise an electrical conductor and a corresponding energy storage, with which in spite of the aforementioned technical problems reliable operation with optimum material use and moreover simple mounting with minimum possible fault susceptibility is ensured.

This object is achieved with the features of Claims 1 and 14. Advantageous developments of the invention are given in the dependent claims. All combinations of at least two features given in the specification, the claims and/or the figures also fall within the framework of the invention. At the given value ranges, values within the indicated limits will also be disclosed as boundary values and will be claimed in any combination.

The invention is based on the idea of applying the components which are necessary for connection of (high current) energy storages to a current consumer prefabricated to a wafer or circuit board so that a connection of the energy storage or the energy storages is greatly simplified in mounting. It has been ascertained that the above described technical problems can be surprisingly easily solved by this measure and by other measures which are described below. This is because on the one hand a wiring structure can be integrated on a circuit board and at the same time printed conductors of the circuit board can be implemented for other aspects which are relevant in this connection, such as for example the monitoring of the charging state or the cell voltage.

Such a high current connection device can accordingly have the following features:

two terminals for connecting the high current connection device to a current consumer, at least two positive terminal contact-making connections for connection to positive terminals of the energy storage units, at least two negative terminal contact-making connections for connection to the negative terminals of the energy storage units, a circuit board for accommodating the terminals, the positive terminal contact-making connections and the negative terminal contact-making connections and each positive terminal contact-making connection is assigned to one negative terminal contact-making connection at a time and to one energy storage unit at a time.

The two terminals can penetrate the circuit board for example in one edge region or can project out of the circuit board, for example as high current pins or jacks, to which corresponding high current consumers can be easily connected.

In one advantageous configuration of the invention the energy storage units are made as battery cells and the energy storage is made as a battery block.

In another configuration of the invention the positive terminal contact-making connections and/or the negative terminal contact-making connections are made as especially oblong strips. Made as strips, the contact-making connections have the advantage of being easily connectable to the circuit board. Moreover high current intensities can be conducted by the execution as strips with little space requirement. Advantageously the positive terminal and/or the negative terminal contact-making connections are applied or can be applied as independent components to the circuit board.

As cross section of the contact-making connections for a typical energy storage unit there are a width of 5 to 20 mm, preferably 10 mm, and a material thickness from 1 mm to 3 mm, preferably 1.5 to 2.5 mm. The oblong configuration moreover makes it possible to stably fix the contact-making connections, for example by laser welding, to corresponding terminals on the energy storage units so that the aforementioned vibrations and changes of size do not lead to electrical connections being broken during operation.

Advantageously the positive terminal contact-making connections are formed from a material which is different from the negative terminal contact-making connections, especially from copper or aluminum, so that when the corresponding terminals of the energy storage units are connected no unwanted electrochemical processes or technical problems occur when the components are connected.

By the positive terminal contact-making connections and the negative terminal contact-making connections being located overlapping in one overlapping section at a time, the positive terminal contact-making connections and the negative terminal contact-making connections can be easily connected in an electrically conductive manner over a large area and it is also ensured in turn here that the connection does not break during operation due to vibrations or temperature fluctuations. To the extent the material pairing of the positive terminal contact-making connections and the negative terminal contact-making connections in the prior art leads to problems, by providing an overlapping section and by prefabrication a connection matched to the respective material pairing can be implemented, and the negative terminal contact-making connections and the positive terminal contact-making connections can be prefabricated before connection to the circuit board, especially automated. In a material pairing of aluminum and copper for example there can advantageously be ultrasonic welding.

In another advantageous embodiment of the invention it is provided that the positive terminal contact-making connections and/or negative terminal contact-making connections, especially outside the overlapping section, each have one contact-making region preferably angled relative to the overlapping section for contact-making of the positive terminals and/or negative terminals of the energy storage units. In this way, for contact-making of the energy storage units there need not be any other components separately and the above described advantages also apply here, for example simple fixing of the positive terminals and/or negative terminals, for example by laser welding.

If the terminal contact-making connections, especially in the region of the overlapping sections, are fixed by fixing means on the circuit board, preferably by a solder connection, an intimate connection of the terminal contact-making connections which are provided as separate components to the circuit board can also be implemented so that temperature fluctuations and vibrations of the high current connection device cannot do any harm.

In one special embodiment of the invention the terminal contact-making connections are made U-shaped in cross section, the contact-making regions forming legs and the overlapping section forming a bottom of the terminal contact-making connections. Thus the positive terminals and/or negative terminals of the energy storage units can be easily pushed through slots provided in the circuit board from the back of the circuit board, parallel to the legs. Advantageously, as a result of the geometry, at least tentative contact-making of the positive terminals and/or negative terminals to the legs of the terminal contact-making connections can take place. In addition it can be fixed mechanically and/or by welding.

One important aspect of the invention is that the high current connection device is or can be provided with a monitoring means or with monitoring means, for example with monitoring means for tapping of parameters, especially the cell voltage, on one or more terminal contact-making connections. The monitoring means are advantageously integrated into the circuit board, especially as circuits of the circuit board or as printed conductors of the circuit board. Thus the circuit board can be used at the same time as a structure for contact-making of energy storage units and for monitoring of parameters of energy storage units or of the energy storage. Advantageously the monitoring means has an interface for connection of an evaluation unit for evaluating and optionally regulating the energy storage, and the connection can be made as a socket.

Advantageously the monitoring means has printed conductors which are printed onto the circuit board or etched into the circuit board and which are or can be connected to monitoring connections of the terminal contact-making connections. If the tapping of the cell voltage or the tapping of the parameters takes place on one copper component of the terminal contact-making connections, it can be especially precise since a high precision measurement is advantageous for control/adjustment of the energy storage.

To the extent the monitoring connections at the same time form the fixing means, at the same time a further function can be implemented by the fixing means, especially since the fixing means are attached anyway to the circuit board and can be brought into contact there with corresponding printed conductors of the circuit board.

In another advantageous embodiment of the invention, it is provided that the positive terminal contact-making connections and/or the negative terminal contact-making connections each make electrical contact either in series and/or in parallel. Depending on the profile of requirements of the current intensity and voltage which is to be made available by the energy storage, with the high current connection device as claimed in the invention a plurality of possibilities can be easily implemented.

As claimed in the invention there is moreover an energy storage, especially for hybrid vehicles, consisting of several energy storage units, the energy storage units being electrically connected in parallel and/or in series to one another by a high current connection device according to one of the preceding claims. Another aspect of the invention which can be combined with the aforementioned energy storage is that the energy storage can be connected to a current consumer via the high current connection device.

Other advantages, features and details of the invention will become apparent from the following description of preferred exemplary embodiments and using the drawings.

FIG. 1 shows a perspective plan view of a high current connection device as claimed in the invention.

FIG. 1 shows a high current connection device 1 with terminal contact-making connections 4.1, 4.2, 4.3, 4.4, 4.5, 4.6, 4.7, 4.8, 4.9, 4.10, 4.11 consisting of positive terminal contact-making connections 2.1, 2.2, 2.3, 2.4, 2.5, 2.6, 2.7, 2.8, 2.9, 2.10, 2.11 and negative terminal contact-making connections 3.1, 3.2, 3.3, 3.4, 3.5, 3.6, 3.7, 3.8, 3.9, 3.10, 3.11. The terminal contact-making connections 4.1 to 4.11 are arranged offset to one another in two rows 18, 19 such that one positive terminal contact-making connection of the row 18 is aligned flush with one negative terminal contact-making connection of the row 19, for example the positive terminal contact-making connection 2.2 with the negative terminal contact-making connections 3.1.

The energy storage units (e.g. energy storage unit 100) are arranged in the illustrated embodiment such that they form a single row underneath the circuit board 9, parallel to the longitudinal extension of the terminal contact-making connections 4.1 to 4.11. The energy storage unit shown rearmost in FIG. 1 accordingly makes contact by its copper or steel positive terminal (not shown) with the copper positive terminal contact-making connection 2.1 and with its negative terminal of aluminum (not shown with a terminal connection 16$p$, which leads to the terminal 16 in an electrically conductive manner. The terminal connection 16$p$ can be provided in across section which is necessary for the high current.

The negative terminal contact-making connection 3.1 of aluminum in turn makes contact with the negative terminal of the next energy storage unit, while the positive terminal of this energy storage unit is connected or fixed to the positive terminal contact-making connection 2.2, especially by laser welding. The positive terminal contact-making connection 2.2 and the negative terminal contact-making connection 3.1 are aligned flush. The adjacent energy storage units are turned toward one another, therefore alternating positive terminal to the left and positive terminal to the right.

Accordingly, in this embodiment a serial connection arises from the negative terminal of the first energy storage unit which is connected to the terminal 16 as far as the positive terminal 101 of the energy storage unit 100 which is frontmost in FIG. 1. It is connected to the terminal 17 in an electrically conductive manner via a terminal connection 17$p$.

The negative terminal 102 of the energy storage unit 100 which is frontmost is connected to the negative terminal contact-making connection 3.11 from underneath through a slot 12 analogously to all other terminals of the energy storage units.

The terminal contact-making connections 4.1 to 4.11 are made U-shaped, consisting of a bottom 5 and two legs 6, 6'. The positive terminal contact-making sections 2.1 to 2.11 and the negative terminal contact-making sections 3.1 to 3.11 are each L-shaped in cross section and each consist of a contact-making region 7, 7' and an overlapping section 8. In the overlapping section 8 which forms the bottom 5 of the terminal contact-making connections 4.1 to 4.11, the positive terminal contact-making connections 2.1 to 2.11 and the negative terminal contact-making connections 3.1 to 3.11 overlap. The respectively pertinent positive terminal contact-making connections 2.1 and negative terminal contact-making connections 3.1 or 2.2 and 3.2 etc. are connected in the overlapping section 8 by ultrasonic welding since the positive terminal contact-making connections 2.1 to 2.11 and the negative terminal contact-making connections 3.1 to 3.11 are formed from different materials, specifically especially copper and aluminum.

The terminal contact-making connections 4.1 to 4.11 are fixed on a circuit board 9 by a solder connection, for example on the two longitudinal ends 10, 11 of each terminal contact-making connection 4.1 to 4.11. For making contact of the contact-making regions 7, 7' with the corresponding positive terminals/negative terminals of the energy storage units which are connected from underneath to the high current connection device 1, slots 12, 12' are made, especially milled, into the circuit board 9, through which correspondingly made positive terminals/negative terminals of the energy storage units can be inserted.

The slots 12, 12' are arranged in parallel flush with the respectively assigned contact-making region 7, 7' in addition to the respective terminal contact-making connection 4.1 to 4.11 so that the positive terminals/negative terminals come into contact as much as possible when pushed through with the corresponding contact-making regions 7, 7'. The connection between the contact-making regions 7, 7' and the positive terminals/negative terminals of the energy storage units takes place for example by laser welding along the longitudinal extension of the contact-making region 7, 7'.

In order to nondestructively allow temperature fluctuations and other changes of size, the slots 12, 12' project slightly over the terminal contact-making connections 4.1 to 4.11 on their longitudinal ends 10, 11.

Hold-downs (not shown) can be inserted into openings 13 in the circuit board 9 for additional fixing of the terminal contact-making connections 4.1 to 4.11.

From each terminal contact-making connection 4.1 to 4.11 printed conductors 15 of the circuit board 9 lead to a monitoring connection 14 which is made as socket. The circuit boards 15 tap parameters such as for example the cell voltage or the charging state of the respective energy storage unit on the respectively assigned terminal contact-making connection 4.1 to 4.11 and the parameters are evaluated by an evaluation unit which is connected or can be connected to a monitoring connection 14 and are used for control/adjustment of the energy storage.

REFERENCE NUMBER LIST

1 high current connection device
2.1 to 2.11 positive terminal contact-making connections
3.1 to 3.11 negative terminal contact-making connections
4.1 to 4.11 terminal contact-making connections
5 bottom
6, 6' legs
7, 7' contact-making region
8 overlapping section
9 circuit board
10, 11 longitudinal ends
12, 12' slots
13 openings
14 monitoring connection
15 printed conductors
16 terminal
16*p* terminal connection
17 terminal
17*p* terminal connection
18 row
19 row

The invention claimed is:

1. A high current connection device for parallel and/or serial contact-making of several energy storage units of an energy storage system, the high current connection device comprising:
   two terminals for connecting the high current connection device to a current consumer;
   at least two positive terminal contact-making connections for connection, which are made as oblong strips and which have an L-shaped cross section, to positive terminals of the energy storage units;
   at least two negative terminal contact-making connections, which are made as oblong strips and which have an L-shaped cross section, for connection to negative terminals of the energy storage units;
   a circuit board for accommodating the terminals, the positive terminal contact-making connections and the negative terminal contact-making connections, wherein:
   each of said positive terminal contact-making connections are electrically connected to said negative terminal contact-making connections respectively,
   said two terminals extend along an extending direction of the positive terminal contact-making connections and negative terminal contact making connections,
   said positive terminal contact-making connections and said negative-terminal contact-making connections are fixed by fixing means on the circuit board, and
   a portion of each of the positive terminal contact-making connections and a portion of each of the negative terminal contact-making connections overlap on said circuit board and are electrically connected to each other so that they form an overlapping section.

2. The high current connection device as claimed in claim 1, wherein the energy storage units comprise battery cells and the energy storage system comprises a battery block.

3. The high current connection device as claimed in claim 1, wherein:
   the positive terminal contact-making connections are formed from copper and the negative terminal contact-making connections are formed from aluminum; or
   the positive terminal contact-making connections are formed from aluminum and the negative terminal contact-making connections are formed from copper.

4. The high current connection device as claimed in claim 1, wherein the positive terminal contact-making connections and the negative terminal contact-making connections form terminal contact-making connections.

5. The high current connection device as claimed in claim 1, wherein the positive terminal contact-making connections and/or the negative terminal contact-making connections, outside the overlapping section, each have one contact-making region angled relative to the overlapping section for contact-making of the positive terminals and/or negative terminals of the energy storage units.

6. The high current connection device as claimed in claim 4, wherein the terminal contact-making connections, in the region of the overlapping sections, are fixed on the circuit board by a solder connection.

7. The high current connection device as claimed in claim 4, wherein the terminal contact-making connections are made U-shaped in cross section, the contact-making regions forming legs and the overlapping section forming a bottom of the terminal contact-making connections.

8. The high current connection device as claimed in claim 1, further comprising a monitoring means which has been integrated into the circuit board for tapping of parameters on one or more of the terminal contact-making connections.

9. The high current connection device as claimed in claim 8, wherein the monitoring means has printed conductors which are printed onto the circuit board or etched into the circuit board and which are connected to monitoring connections of the terminal contact-making connections.

10. The high current connection device as claimed in claim 1, wherein the terminal contact-making connections and/or the negative terminal contact-making connections make electrical contact either in series and/or in parallel.

11. Energy storage comprising several energy storage units, the energy storage units being electrically connected to one another in series and/or in parallel by a high current connection device as claimed in claim 1.

12. Energy storage as claimed in claim 11, wherein said energy storage can be connected to a current consumer via the high current connector device.

13. The high current connection device as claimed in claim 1, further comprising a first row having a plurality of positive terminal contact-making connections and a plurality of negative terminal contact-making connections, each of the positive terminal contact-making connecting alternating with the negative terminal contact-making connections in the first row.

14. The high current connection device as claimed in claim 13, further comprising a second row having a plurality of positive terminal contact-making connections and a plurality of negative terminal contact-making connections, each of the positive terminal contact-making connecting alternating with the negative terminal contact-making connections in the second row.

15. The high current connection device as claimed in claim 13, wherein each of the positive terminal contact-making connections in the first row are aligned with a respective negative terminal contact-making connection in the second row, and each of the negative terminal contact-making connections in the first row are aligned with a respective positive terminal contact-making connection in the second row.

* * * * *